Oct. 4, 1966   H. CLARK   3,276,727
COMPENSATING BOUNDARY LAYER CONTROL NOZZLE
Filed April 26, 1965
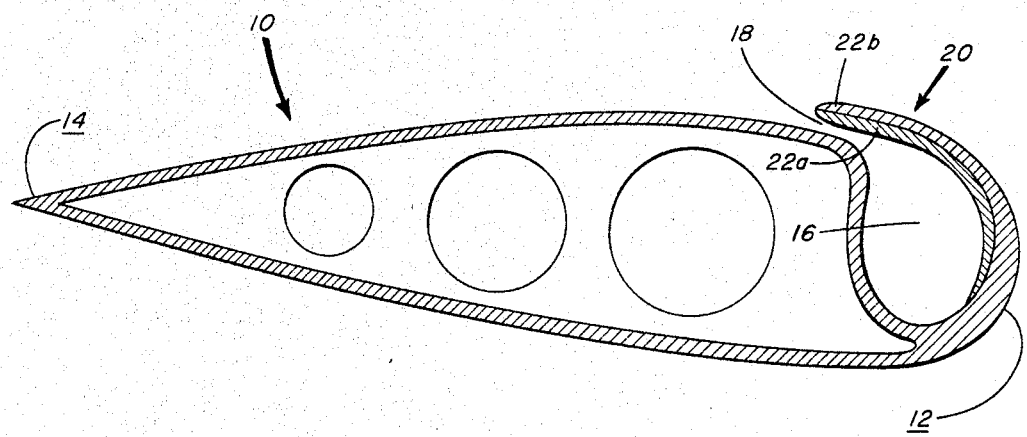
Herbert Clark
INVENTOR.
BY
ATTORNEY.
AGENT.

United States Patent Office 3,276,727
Patented Oct. 4, 1966

3,276,727
COMPENSATING BOUNDARY LAYER
CONTROL NOZZLE
Herbert Clark, Dallas, Tex., assignor, by mesne assignments, to the United States of America as represented by the Secretary of the Navy
Filed Apr. 26, 1965, Ser. No. 451,081
4 Claims. (Cl. 244—42)

This invention relates to an aircraft which employs a boundary layer control system to increase lift and decrease drag of its wings, and is more particularly concerned with the automatic modification of the area of boundary layer control nozzles to compensate for the temperature changes of the boundary layer control air attributable to the changes in the power settings of the aircraft engines which must necessarily be made in order to perform the various routine maneuvers of flight.

In one of the basic methods heretofore proposed for the purpose of modifying boundary layer air from aircraft structures and thereby providing low-drag laminar flow, high pressure air is taken from the engine and piped to the aerodynamic surfaces, being discharged through nozzles in the surfaces to modify the boundary layer. During high power engine operation, however, with boundary layer control nozzles of fixed areas, an excessive amount of bleed air is used over and above the boundary layer control requirements, resulting in an excessive amount of engine thrust loss. On the other hand, when the engine is operating at low power, such as during the landing of the aircraft, an insufficient amount of air is provided by the boundary layer control nozzles to secure the most satisfactory results. Therefore it is apparent that to eliminate this problem and lose a minimum of engine thrust the area of the nozzles in a boundary layer control system should be capable of being varied in accordance with the power settings of the aircraft engines so that when low air pressures are available to the boundary layer control system, larger nozzle areas may be provided for discharging the air and, conversely, when high air pressures are received by the system nozzles of a smaller area may be made available for removing the boundary layer.

Accordingly, it is an object of this invention to provide new and improved means for modifying boundary layer air from the external surfaces of an aircraft structure to increase the lift and decrease the drag thereof, which is free of malfunctioning tendencies, which is simple in design and construction, which is economical to manufacture and which may be easily installed in various aircraft structures.

Another object of this invention is to provide a boundary layer control system for blowing away the boundary layer air from the external surfaces of an aircraft structure which derives its pressurized air from the aircraft engines, and in which the areas of the discharge nozzles therof are variable in accordance with the power setting of the engine.

Still another object of this invention is the provision of a boundary layer control nozzle for discharging air piped from an aircraft engine to modify the boundary layer air from the external surface of an airfoil structure of the aircraft which control nozzle is automatically variable in area according to the power setting of the aircraft engine or engines, such that with high power settings a nozzle of smaller area is provided for discharging the air and with low power settings a nozzle of larger area is provided.

Still other objects and many of the features and attendant advantages of this invention will become apparent from the following description taken in connection with the accompanying drawing illustrating a diagrammatic sectional view taken of the side of an aircraft wing having a boundary layer control nozzle constructed in accordance with the teachings of the present invention provided in the upper surface of the wing adjacent the leading edge thereof.

Referring now to the single figure of the drawing, for a more complete understanding of the invention, the numeral 10 indicates a typical laminar flow airfoil or wing having a leading edge section 12 and a trailing edge section 14. Within the leading edge section 12 there is provided a pressurized fluid duct 16 terminating in an externally and rearwardly directed discharge nozzle 18 and a leading edge lip portion designated generally by the numeral 20, which comprises a curved continuation of the lower surface of the leading edge of the wing. The duct 16 is supplied with pressurized flow which discharges as a relatively high velocity jet from nozzle 18. In accordance with known practice the duct 16 may be connected with any suitable source of air under pressure, which source, in respect to this invention, may be conveniently the compressor section of a jet engine or the like. The air under pressure is delivered from the duct 16 by means of the nozzle 18 and is directed rearwardly over the upper surface of the wing 10 to blow away the boundary layer of air and thereby effectively increase the lift and decrease the drag of the wing.

In order to avoid the aforementioned problems encountered by previously known boundary layer control devices of the type thus far described, it is the purpose of this invention to provide such a boundary layer control system having a variable-area nozzle for discharging the pressurized air. Considering first the fact that as the power setting of the aircraft engine also increased, so is the pressure of the boundary layer control air which is carried through duct 16 from the engine for discharge from nozzle 18 is proportionately increased, and likewise the temperature of that air is also increased. Conversely, when the engine power setting is decreased, the pressure of the boundary layer control air is decreased, as is the temperature of the air being discharged through the nozzle 18. By way of example, with higher power settings, as during take-off, the nozzle temperature may be approximately 700° F., whereas with the lower power settings used during a landing approach the boundary layer control nozzles may operate at temperatures of 350–400° F. Thus, if the nozzle gap were approximately 0.022 inch, restriction of the gap by a mere 0.004 inch would reduce the mass flow therethrough by about 14 percent.

Accordingly, by taking advantage of the change in the temperature of the boundary layer control air that accompanies each change in the power setting of the aircraft engine, a nozzle having an area automatically variable according to any increase or decrease in the temperature of the air passing therethrough may be readily provided by fabricating the leading lip edge portion of the nozzle from a bi-metallic plate. Thus, referring again to the drawing, it may be observed that the leading edge lip portion 20 of the nozzle 18 is comprised of two separate strips 22a and 22b of different metals welded together or otherwise bonded together by any suitable means and having different coefficients of expansion. As shown, the metal strip 22b has the larger coefficient of expansion and hence causes the lip portion 20 to curve inwardly and restrict the flow of air through nozzle 18 when the air temperature increases, as during high power engine operation. On the other hand, if the temperature of the air provided for boundary layer control decreases, as occurs during landing approach or low power engine operation, the lip portion 20 curves outwardly to permit greater flow of air through the nozzle 18. The metals utilized for strips 22a and 22b are selected according to the temperature range of the air acting on the strips and the degree of nozzle restriction required within that range, factors which are dependent upon the particular aircraft employing this boundary layer control means, and thus may be any suitable metals for achieving the desired results under specific performance characteristics of the aircraft.

From the foregoing description of the embodiment illustrated in the accompanying drawing it will be seen that the present compensating boundary layer control nozzle fully accomplishes the aims, objects and advantages of the invention. Obviously many modifications and variations of the invention are possible in the light of the above teachings. It is therefore to be understood that within the scope of the appended claims the invention may be practiced otherwise than as specifically described.

What is claimed is:

1. A powered airfoil, adapted to be presented to a flow of air, including upper and lower surfaces merging into a leading edge and a trailing edge, boundary layer control means comprising a variable-area jet nozzle disposed in the leading edge portion of the uppermost one of said surfaces in a manner to direct a blowing jet rearwardly over said surface, duct means for communicating air at a relatively high pressure from an aircraft engine to said nozzle for discharging said blowing jet therefrom into the circulatory flow about said airfoil, the area of said jet nozzle being varied automatically in correlation with changes in engine power output, and wherein said jet nozzle comprises a bimetallic element for increasing the area of the nozzle when the temperature of the air provided by the engine decreases and decreasing the nozzle area when the temperature of the air provided by the engine increases.

2. A powered airfoil as in claim 1, wherein said jet nozzle is positioned adjacent the leading edge of said airfoil.

3. In an aircraft, an airfoil adapted to be presented to a flow of air including upper and lower surfaces merging into a leading edge and a trailing edge, means operable to modify boundary layer air from said airfoil comprising at least one bimetallic jet nozzle disposed in a portion of one of said surfaces arranged to direct a blowing jet over said surface, and duct means communicating with said jet nozzle for conducting air at a relatively high pressure from an engine of the aircraft to said nozzle for discharging said blowing jet therefrom into the circulatory flow about said airfoil, whereby when the engine power setting is cut back, the temperature of the boundary layer control air provided to the jet nozzle is reduced and the area of the nozzle is automatically increased, and when the power setting is increased, the temperature of the boundary layer control air is raised and the nozzle area is automatically decreased.

4. In a powered airfoil adapted to be presented to a flow of air including upper and lower surfaces merging into a leading edge and a trailing edge, means operable to modify boundary layer air from said airfoil comprising at least one jet nozzle disposed therein for discharging relatively high pressure air from an engine of the aircraft in the form of a blowing jet into the circulatory flow about the airfoil, and means for varying the area of said nozzle so that when the engine power setting is cut back, accordingly reducing the temperature of the boundary layer control air being discharged through said nozzle, the nozzle area is automatically increased to increase the flow of boundary layer control air therethrough, and when the engine power setting is increased, thus raising the temperature of the air being discharged, the nozzle area is automatically reduced to reduce the flow therethrough of the boundary layer control air.

References Cited by the Examiner

UNITED STATES PATENTS

| 2,249,970 | 7/1941 | McKune et al. | 137—457 |
| 2,909,032 | 10/1959 | Davies | 137—468 X |
| 3,058,695 | 10/1962 | Simonis | 244—42 |
| 3,161,377 | 12/1964 | Balluff | 244—42 |

MILTON BUCHLER, *Primary Examiner.*

B. BELKIN, *Assistant Examiner.*